United States Patent
Yamamoto et al.

(10) Patent No.: US 9,767,530 B2
(45) Date of Patent: Sep. 19, 2017

(54) IMAGE DISPLAYING APPARATUS FOR DISPLAYING PREVIEW IMAGES

(71) Applicant: Konica Minolta, Inc., Chiyoda-ku (JP)

(72) Inventors: Kenzo Yamamoto, Toyohashi (JP); Manabu Furukawa, Nagaokakyo (JP); Akihiko Oda, Toyohashi (JP); Hiroki Tajima, Toyokawa (JP); Hiroki Ueda, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 276 days.

(21) Appl. No.: 14/322,003

(22) Filed: Jul. 2, 2014

(65) Prior Publication Data

US 2015/0009217 A1    Jan. 8, 2015

(30) Foreign Application Priority Data

Jul. 3, 2013    (JP) .................................. 2013-139586

(51) Int. Cl.
*G06T 3/40*    (2006.01)
(52) U.S. Cl.
CPC ..................... *G06T 3/40* (2013.01)
(58) Field of Classification Search
None
See application file for complete search history.

(56) References Cited

U.S. PATENT DOCUMENTS

| 8,368,948 B2 | 2/2013 | Nakano | |
| 2012/0019863 A1* | 1/2012 | Sensu | G06F 3/04817 358/1.15 |
| 2013/0249835 A1* | 9/2013 | Muriss | G06F 3/0488 345/173 |
| 2015/0205499 A1* | 7/2015 | Freeman | G06F 3/04845 715/711 |

FOREIGN PATENT DOCUMENTS

| CN | 101562680 A | 10/2009 |
| JP | 2005-184448 A | 7/2005 |

(Continued)

OTHER PUBLICATIONS

Notice of Grounds of Rejection dated Apr. 28, 2015 issued in the corresponding Japanese Patent Application No. 2013-139586 and English translation (10 pages).

(Continued)

*Primary Examiner* — Vu Nguyen
(74) *Attorney, Agent, or Firm* — Buchanan Ingersoll & Rooney PC

(57) ABSTRACT

An image forming apparatus as an image displaying apparatus displays a preview image of the first page at a first resolution. The image forming apparatus enlarges and displays the preview image of the first page when receiving an operation to enlarge the preview image of the first page. The image forming apparatus stores a history of the resolution of the preview image being enlarged of the first page. The image forming apparatus determines a second resolution based on the history of the resolution, when receiving an (Continued)

operation to display a preview image of the second page. The image forming apparatus generates the preview image of the second page at the second resolution.

19 Claims, 15 Drawing Sheets

(56) References Cited

FOREIGN PATENT DOCUMENTS

| | | | |
|---|---|---|---|
| JP | 2006-203702 | A | 8/2006 |
| JP | 2006-287625 | A | 10/2006 |
| JP | 4450322 | B2 | 4/2010 |

OTHER PUBLICATIONS

First Office Action issued Nov. 30, 2016 by the State Intellectual Property Office of People's Republic of China in corresponding Chinese Patent Application No. 201410315353.0, and English language translation of Office Action (23 pages).

\* cited by examiner

FIRST PAGE

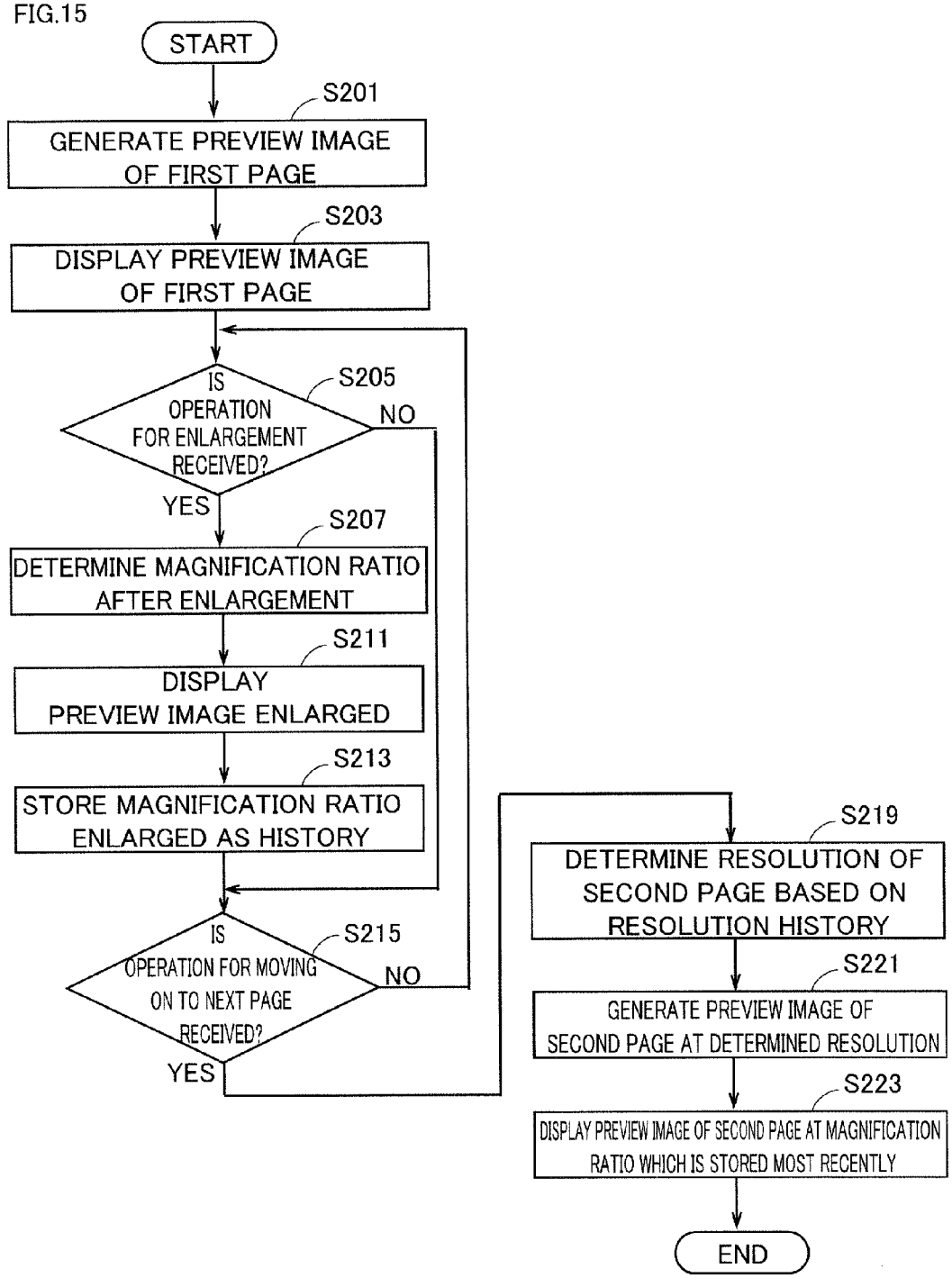

IMAGE DISPLAYING APPARATUS FOR DISPLAYING PREVIEW IMAGES

This application is based on Japanese Patent Application No. 2013-139586 filed with the Japan Patent Office on Jul. 3, 2013, the entire content of which is hereby incorporated by reference.

BACKGROUND OF THE INVENTION

Field of the Invention

This invention relates to an image displaying apparatus. More specifically, this invention relates to an image displaying apparatus for displaying preview images.

Description of the Related Art

Some image forming apparatuses, for example MFPs (Multi Function Peripherals), have a preview function. The preview function is to display images (preview images) in its final form to be printed on sheets, on a display of an image forming apparatus or an operation terminal. A conventional image forming apparatus having a preview function generates a preview image in the following manner. The image forming apparatus modifies an image of a document read by an image reading unit based on a mode set during copying operation or the like, thereby the image forming apparatus generates data of printing images. The image forming apparatus compresses the printing images to a size suitable for a displaying unit with maintaining its resolution for generating the preview image.

However, according to preview images made by the above manner, the high resolution of printing images is maintained. Then, amounts of data to be processed are large when displaying preview images. In the result, it takes much time to display preview images and operability of an image forming apparatus worsened.

A technique of displaying preview images or thumbnails fast is disclosed in Document 1 below and the like. Document 1 discloses that thumbnails included in selectable pages on a display screen are generated beforehand in addition to thumbnails displayed on the display screen. Then, thumbnails can be displayed fast. Document 1 also discloses that thumbnails included in selectable pages on a display screen are generated beforehand in addition to thumbnails displayed on the display screen. Then, preview images can be displayed fast. The preview images are generated at a resolution corresponds to a maximum magnification ratio which user can select.

Further, there is another technique in which a display device generates a preview image of a next page when displaying an enlarged preview image of a page and going to the next page. The preview image of the next page has a resolution corresponds to a magnification ratio of the enlarged preview image.

Document 1: JP2006-203702 (Japan Patent No. 4446447)

According to Document 1, the resolution at which the preview images are generated beforehand corresponds to a maximum magnification ratio which user can select. The Preview images are prepared at an excessively high resolution on pages in which a user does not enlarge the preview images or a user does not enlarge the preview images at the maximum magnification ratio. Then, a lot of limitary memory spaces are excessively consumed by generating images at the excessively high resolution. It burdens a CPU (Central Processing Unit) beyond necessity and a processing speed of the CPU is slowed down. It takes more time for a displaying process of preview images and may give a user a lot of stress.

As for the aforementioned another technique, it is possible that a user decreases the magnification ratio of a preview image (reduces the size of a preview image) to select the next page after enlarging the preview image to checking the image in detail. In this situation, the displaying device generates the preview image of the next page at a resolution lower than a resolution needed for checking the image in detail. Then the displaying device has to generate the preview image of the next page again at a high resolution when the user wants to check the preview image of the next page in detail. Consequently, it takes more time for a displaying process of preview images and may give a user a lot of stress.

SUMMARY OF THE INVENTION

The object of this invention is to provide an image displaying apparatus being able to display a preview image fast.

An image displaying apparatus according to an aspect of the present invention includes a first image display unit for displaying a first preview image at a first resolution; an enlarge operation receiving unit for receiving an operation to enlarge the first preview image; an enlarge display unit for displaying the first preview image enlarged when the enlarge operation receiving unit receives the operation; a storage unit for storing a history of at least one of a magnification ratio of the first preview image being displayed and a resolution of the first preview image being displayed; a display operation receiving unit for receiving a operation to display a second preview image which is not the first preview image when displaying the first preview image; a determination unit for determining a second resolution based on the history stored in the storage unit when the display operation receiving unit receives the operation; and an image generation unit for generating the second preview image at the second resolution.

A method of controlling an image displaying apparatus according to another aspect of the present invention includes displaying a first preview image at a first resolution; receiving an operation to enlarge the first preview image; displaying the first preview image enlarged when receiving the operation to enlarge the first preview image; storing a history of at least one of a magnification ratio of the first preview image being displayed and a resolution of the first preview image being displayed; receiving a operation to display a second preview image which is not the first preview image when displaying the first preview image; determining a second resolution based on the history stored when receiving the operation to display a second preview image; and generating the second preview image at the second resolution.

A non-transitory computer-readable recording medium, according to still other aspect of the present invention, encoded with a control program for an image displaying apparatus, the control program causing a computer to execute displaying a first preview image at a first resolution; receiving an operation to enlarge the first preview image; displaying the first preview image enlarged when receiving the operation to enlarge the first preview image; storing a history of at least one of a magnification ratio of the first preview image being displayed and a resolution of the first preview image being displayed; receiving a operation to display a second preview image which is not the first preview image when displaying the first preview image; determining a second resolution based on the history stored when receiving the operation to display a second preview image; and generating the second preview image at the second resolution.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 shows a flowchart for a behavior of an image forming apparatus at the third modification.

DESCRIPTION OF THE PREFERRED EMBODIMENTS

An embodiment of this invention will be explained in the followings with attached drawings.

In the embodiment below, an image displaying apparatus will be explained when it is an image forming apparatus. The image forming apparatus forms images using an electrophotography method, an electrostatic recording method, or the like. The image forming apparatus includes an MFP, a facsimile device, a copying machine, a printer, or the like. The MFP has a scanner function, a facsimile function, a copying function, a function for a printer, a data transmitting function, and a server function. The image displaying apparatus may not be an image forming apparatus as long as the image displaying apparatus can display preview images. The image displaying apparatus may be a scanner device, a cell-phone, a tablet PC (Personal Computer), or the like.

[A Structure of the Image Forming Apparatus]

Firstly, a structure of the image forming apparatus of this embodiment will be explained.

Figure 1:
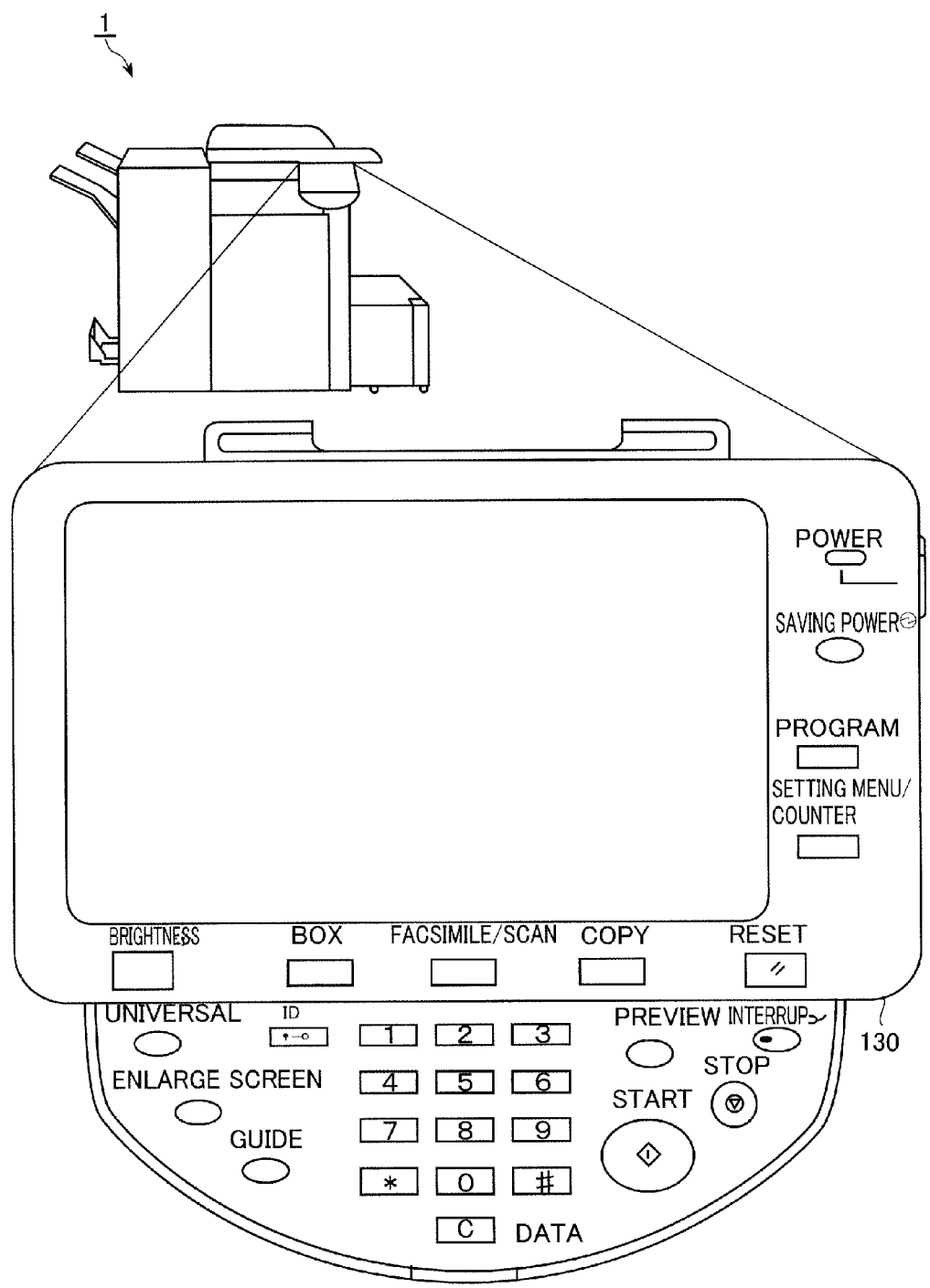
FIG. 1 shows a typical appearance of an image forming apparatus as an embodiment of this invention.

FIG. 1 shows a typical appearance of an image forming apparatus as an embodiment of this invention. In FIG. 1, an operation panel of the image forming apparatus is enlarged and shown.

In this embodiment, image forming apparatus 1 (which is an example of an image displaying apparatus) is an MFP. Image forming apparatus 1 has operation panel 130 on its front. Operation panel 130 displays various kinds of information as for image forming apparatus 1. Operation panel 130 receives operations of image forming apparatus 1.

Figure 2:
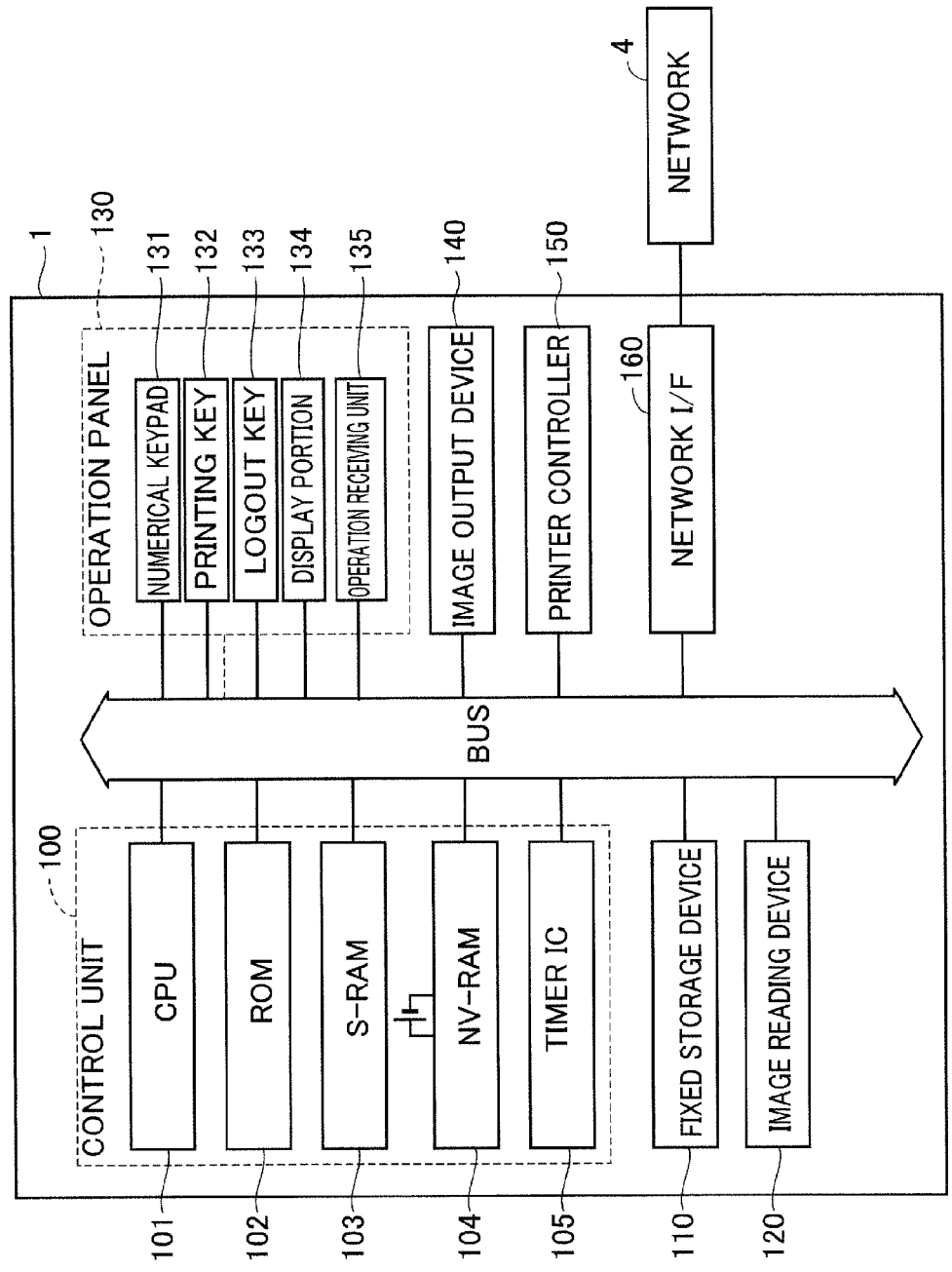
FIG. 2 shows a block diagram of an inner structure of the image forming apparatus 1.

FIG. 2 shows a block diagram of an inner structure of an image forming apparatus.

Referring to FIG. 2, image forming apparatus 1 includes a control unit 100, a fixed storage device 110, an image reading device 120, an operation panel 130, an image output device 140, a printer controller 150, and a network I/F 160. Control unit 100 is connected to fixed storage device 110, image reading device 120, operation panel 130, image output device 140, printer controller 150, and network I/F 160 via a bus.

Control unit 100 controls image forming apparatus 1 totally with regard to kinds of jobs like a scan job, a copy job, a mail sending job, a printing job, or the like. Control unit 100 includes a CPU 101, a ROM (Read Only Memory) 102, an SRAM (Static Random Access Memory) 103, a NVRAM (Non Volatile Random Access Memory) 104, and a timer IC (Integrated Circuit) 105. CPU 101, ROM 102, SRAM 103, NVRAM 104, and timer IC (Integrated Circuit) 105 are connected via a bus. CPU 101 executes a control program stored in ROM 102. ROM 102 stores the control program which controls a behavior of image forming apparatus 1. SRAM 103 is a memory for constructing working areas of CPU 101. NVRAM 104 stores various kinds of settings as for an image forming and is backed-up by a battery. Timer IC 105 measures various kinds of times.

Fixed storage device 110 is a hard disk device, for example. Fixed storage device 110 stores various kinds of information.

Image reading device 120 reads images of documents.

Operation panel 130 receives various kinds of inputs from a user and displays various kinds of information. Operation panel 130 includes a numerical keypad 131, a printing key 132, a log out key 133, a display portion 134, and an operation receiving unit 135. Numerical keypad 131 is for inputting numerals. Printing key 132 is for receiving an execution instruction of printing. Log out key 133 is for receiving an instruction of log out of a user. Display portion 134 displays various kinds of information. Operation receiving unit 135 displays images on display portion 134 and receives an operation of software keys displayed on display portion 134. Operation receiving unit 135 is a touch pad receiving touch operations on display portion 134, for example. Operation panel 130 may include hardware keys other than numerical keypad 131, printing key 132, and log out key 133.

Image output device 140 forms copied images on sheets.

Printer controller 150 generates copied images from printing data received via network I/F 160.

Network I/F 160 connects image forming apparatus 1 to network 4. Network I/F 160 transmits and receives various kinds of information with external devices not shown in the drawings.

[Structures of an Operation Screen]

Next, structures of an operation screen are explained in the followings.

Figure 3:
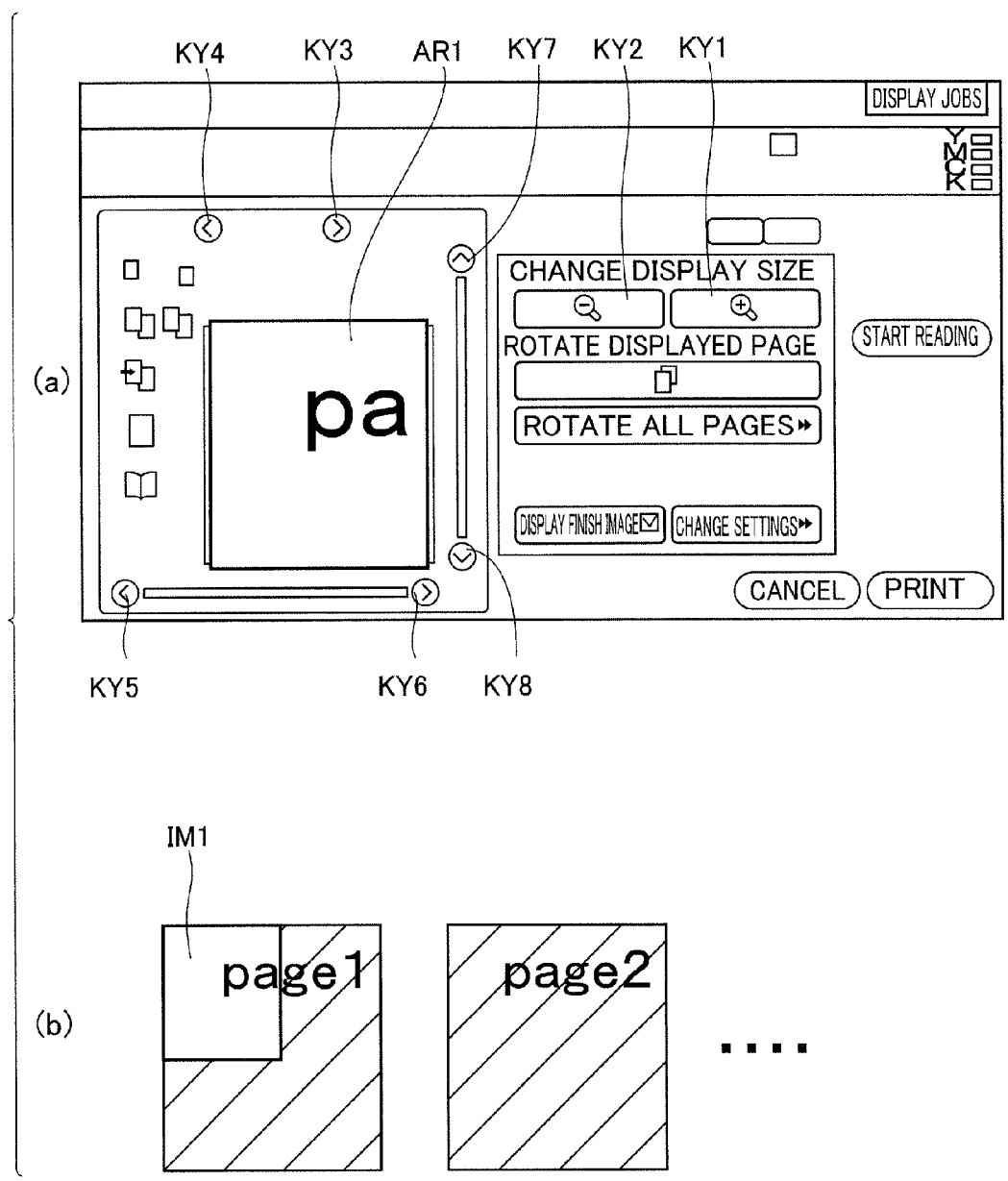
FIG. 3 typically shows an operation screen displayed on display portion 134 of operation panel 130 and documents read by image reading device 120.

FIG. 3 typically shows an operation screen displayed on display portion 134 of operation panel 130 and documents read by image reading device 120. FIG. 3(a) shows an operation screen displayed on display portion 134 of operation panel 130. FIG. 3(b) typically shows documents read by image reading device 120.

Referring to FIG. 3, the operation screen mainly includes an area AR1 for displaying a preview image, keys KY1, KY2, KY3, KY4, KY5, KY6, KY7, and KY8 as indicated in FIG. 3(a).

Key KY1 is a key for heightening a magnification ratio (an enlargement factor) of the preview image. Assume that a preview image is being displayed in area AR1 and key KY1 is pressed or a pinch out operation (which is a kind of a gesture operation) is performed in area AR1. In this situation, image forming apparatus 1 displays a preview image which is a part to be displayed in area AR1 at a magnification ratio which is higher than the present magnification ratio for displaying (Namely, image forming apparatus 1 enlarges and displays the present preview image).

Key KY2 is a key for lowering a magnification ratio of a preview image. Assume that a preview image is being displayed in area AR1, and key KY2 is pressed or a pinch in operation (which is a kind of a gesture operation) is performed in area AR1. In this situation, image forming apparatus 1 displays in area AR1 a preview image of a part which is a display object at a magnification ratio which is lower than the present magnification ratio for displaying (Namely, image forming apparatus 1 reduces and displays the present preview image).

Key KY3 is a key for displaying a preview image of the next page. Assume that a preview image is being displayed in area AR1, and key KY3 is pressed or a swipe operation (which is a kind of a gesture operation) right to left is performed in area AR1. In this situation, image forming apparatus 1 displays a preview image of the next page of the preview image being displayed in area AR1. Key KY3 can be pressed only when there is a next page.

Key KY4 is a key for displaying a preview image of the previous page. Assume that a preview image is being displayed in area AR1, and key KY4 is pressed or a swipe operation (which is a kind of a gesture operation) left to right is performed in area AR1. In this situation, image forming apparatus 1 displays a preview image of the previous page of a preview image being displayed in area AR1. Key KY4 can be pressed only when there is a previous page.

Key KY5 is a key for moving a position of displaying to the left. Key KY6 is a key for moving a position of displaying to the right. Assume that a preview image is being displayed in area AR1 and key KY5 or KY6 is pressed or a flick operation (which is a kind of a gesture operation) of a lateral direction in FIG. 3 is performed in area AR1. In this situation, image forming apparatus 1 displays a new preview image at the position moved to the left or the right or moved in a direction according to the flick operation from the position being displayed.

Key KY7 is a key for moving a position of displaying downward. Key KY 8 is a key for moving a position of displaying upward. Assume that a preview image is being displayed in area AR1 and key KY7 or KY8 is pressed or a flick operation (which is a kind of a gesture operation) of a vertical direction in FIG. 3 is performed in area AR1. In this situation, image forming apparatus 1 displays a new preview image at the position moved in a downward or upward direction or moved in a direction according to the flick operation from the position being displayed.

Image forming apparatus 1 makes a single file by reading images of a document comprising a plurality of pages. Image forming apparatus 1 displays a preview image which is a part of the images of the document in area AR 1 on the operation screen. A preview image of image IM1 of the first page shown in FIG. 3(b) is displayed in area AR1 of FIG. 3(a). Assume that the preview image of image IM1 is being displayed and key KY3, KY4, KY5, KY6, KY7, or KY8 is pressed or a flick operation is performed in area AR1. In this situation, image forming apparatus 1 generates a preview image of a portion (which is indicated by the hatching in FIG. 3(b)) being different from image IM1 and displays it in area AR1.

The number of pages of a document read by image forming apparatus 1 is arbitrary. A preview image which image forming apparatus 1 firstly displays has to be a preview image which is a part of images in a file. Image forming apparatus 1 may firstly display a preview image which is any part of images of a document read.

[an Overview of a Behavior of the Image Forming Apparatus]

Next, an overview of a behavior of the image forming apparatus is described in the followings.

Figure 4:
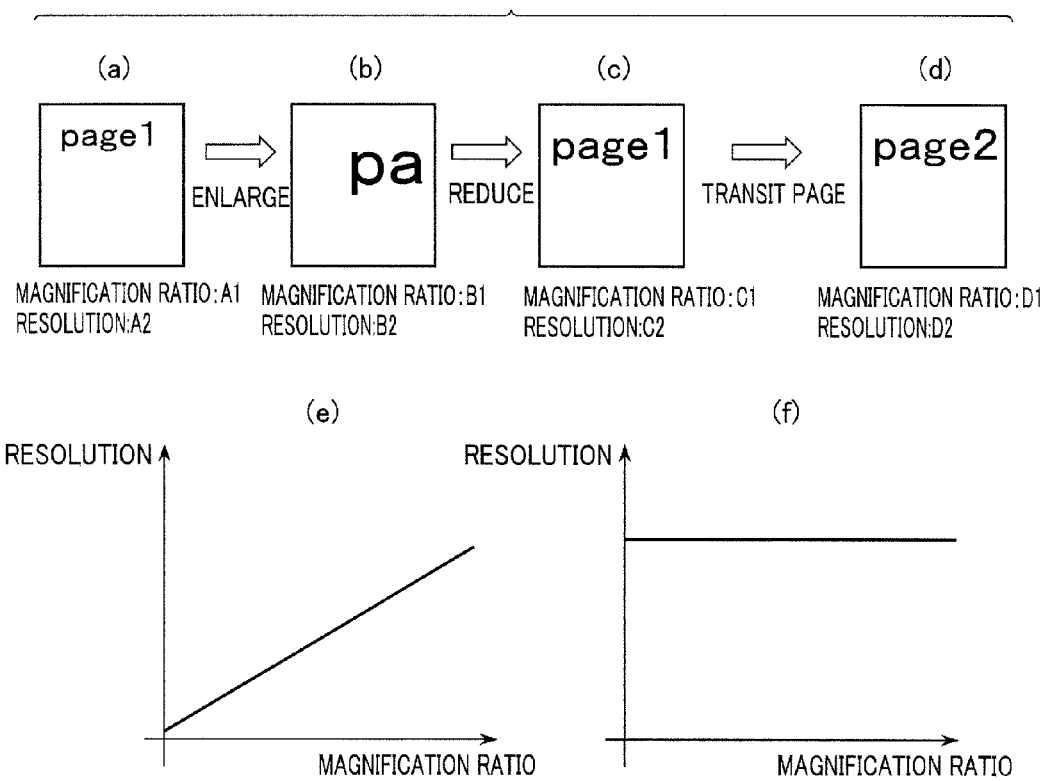
FIG. 4 shows an overview of a behavior of image forming apparatus 1.

FIG. 4 shows an overview of a behavior of image forming apparatus 1. In FIG. 4, the following equations are satisfied: magnification ratio A1<magnification ratio C1<magnification ratio B1, and resolution A2<resolution C2<resolution B2.

Referring to FIG. 4, image forming apparatus 1 reads an image of a document at the situation that a preview function is activated via operation panel 130 or the like. Image forming apparatus 1 generates a preview image (an example of a first preview image) of the first page at resolution A2 which corresponds to magnification ratio A1 as shown in FIG. 4(a). Image forming apparatus 1 displays the generated preview image on area AR1 at magnification ratio A1.

Image forming apparatus 1 receives an operation for enlarging or reducing the preview image from a user when displaying the preview image of the first page. Image forming apparatus 1 determines a magnification ratio and a resolution based on the operation by the user. Image forming apparatus 1 generates a preview image at the determined resolution. Image forming apparatus 1 displays the generated preview image at the determined magnification ratio on area AR1. Namely, image forming apparatus 1 generates a new preview image each time image forming apparatus 1 receive an operation for enlarging or reducing the preview image of the first page by a user. It will be explained in the followings with concrete descriptions.

Image forming apparatus 1 receives an operation (an operation of pressing key KY1 or a pinch out operation in area AR1) from a user for enlarging the preview image, when displaying the preview image as shown in FIG. 4(a). Image forming apparatus 1 determines magnification ratio B1 and resolution B2 based on the operation by the user. In particular, an increased amount of a magnification ratio will be larger in case that the pressing period of key KY1 is longer or a movement speed of a touching point of the pinch out operation is faster. It is necessary to display a more detailed part of the image in case that the magnification ratio is higher. Then, the resolution is determined higher in case that the magnification ratio is determined higher. Image forming apparatus 1 generates a preview image of a part of the preview image of the first page at resolution B2 and displays the generated preview image at magnification ratio B1 in area AR1 as shown in FIG. 4(b).

Image forming apparatus 1 receives an operation (an operation of pressing key KY2 or a pinch in operation in area AR1) from the user for reducing the preview image, when displaying the preview image as shown in FIG. 4(b). Image forming apparatus 1 determines magnification ratio C1 and resolution C2 based on the operation by the user. In particular, a decreased amount of a magnification ratio will be larger when the pressing period of key KY2 is longer or a movement speed of a touching point of the pinch in operation is faster. It is not necessary to display a more detailed part of an image in case that the magnification ratio is lower. Then, the resolution is determined lower in case that the magnification ratio is determined lower. Image forming apparatus 1 generates a preview image of a part of the preview image of the first page at resolution C2 and displays the generated preview image at magnification ratio C1 in area AR1 as shown in FIG. 4(*c*).

Image forming apparatus 1 stores the resolution of the preview image after it changed in fixed storage device 110, each time the magnification ratio of the preview image of the first page displayed in area AR1 changed. Namely, a history of the resolution of the preview image of the first page being displayed is stored. Image forming apparatus 1 may store only a transition of the resolution, for example "resolution A2→resolution B2→resolution C2", each time the magnification ratio of the preview image of the first page being displayed in area AR1 changed. Image forming apparatus 1 may store the resolution after it changed and an elapsed time since the preview image of the first page is displayed, each time the magnification ratio of the preview image of the first page being displayed in area AR1 changed. Thereby, image forming apparatus 1 stores a change of the resolution with the passage of time. Further, image forming apparatus 1 may repeat a process for storing a resolution while a preview image of the first page is being displayed. By this method, image forming apparatus 1 stores a change of the resolution with the passage of time. Hereinafter, unless otherwise noted, the case which image forming apparatus 1 stores a change of the resolution with the passage of time will be explained.

Assume that image forming apparatus 1 receives an operation for displaying a new preview image of a part other than the first page when displaying a preview image of the first page. In this situation, image forming apparatus 1 determines a resolution based on the history of the resolution of the preview image of the first page. Image forming apparatus 1 generates a new preview image at the determined resolution and displays the same.

An operation for displaying a new preview image can be an operation for displaying a preview image of a part which is not displayed in area AR1 previously. For example, the operation for displaying a new preview image can be an operation (an operation of pressing key KY3 or a swipe operation right to left in area AR1) for displaying a preview image of the next page or an operation (an operation of pressing key KY4 or a swipe operation left to right in area AR1) for displaying a preview image of the previous page. The operation for displaying a new preview image can be an operation (an operation of pressing key KY5, KY6, KY7, or KY8, or a flick operation in area AR1) for displaying a preview image of a part which has not been displayed yet as a preview image in the first page in case that there is a part which the preview image of the part is not displayed in the first page (for example, only the preview image of image IM1 was displayed).

Image forming apparatus 1 receives an operation for displaying a preview image of the next page from a user when displaying the preview image as shown in FIG. 4(*c*). Image forming apparatus 1 determines resolution D2 based on the history of the resolution of the preview image of the first page. Image forming apparatus 1 generates a preview image of the second page at resolution D2. Image forming apparatus 1 displays the preview image generated at magnification ratio D1 in area AR1 as shown in FIG. 4(*d*). Magnification ratio D1 is arbitrary. It is preferable that magnification ratio D1 is equal to the magnification ratio of the preview image of the first page displayed most recently (here, it is the magnification ratio C1 of the preview image shown in FIG. 4(*c*)).

Assume that image forming apparatus 1 receives an operation for enlarging or reducing the preview image of the second page displayed from a user when displaying the preview image of the second page. In this situation, image forming apparatus 1 does not newly generate a preview image enlarged or reduced. Image forming apparatus 1 changes the magnification ratio of the preview image of the second page already generated. Then, image forming apparatus 1 displays a preview image after it was enlarged or reduced in area AR1. As a result, the resolution of the preview image of the second page is maintained as the resolution determined. The magnification ratio of the preview image after displaying with enlargement or reduction is determined based on an operation by the user.

When image forming apparatus 1 generates a preview image which is an enlarged or reduced preview image of the first page, there is a proportional relation between a magnification ratio and a resolution of the preview image to be generated as shown in FIG. 4(*e*). On the other hand, when image forming apparatus 1 generates a preview image of the second page, a resolution of the preview image to be generated is constant irrespective of a magnification ratio, as shown in FIG. 4(*f*). Namely, although the generated preview image of the second page has a high resolution compared with the magnification ratio, image forming apparatus 1 displays the preview image at the high resolution.

Assume that image forming apparatus 1 receives an operation for enlarging a preview image of the second page from a user at a high magnification ratio to the point where the image quality deteriorates at the resolution of the generated preview image of the second page. In this situation, image forming apparatus 1 may newly generates a preview image of the second page at a high resolution.

[A Method for Determining a Resolution]

Next, a method for determining a resolution of a new preview image will be explained. Here, the first and the second determining methods are explained.

Figure 5:
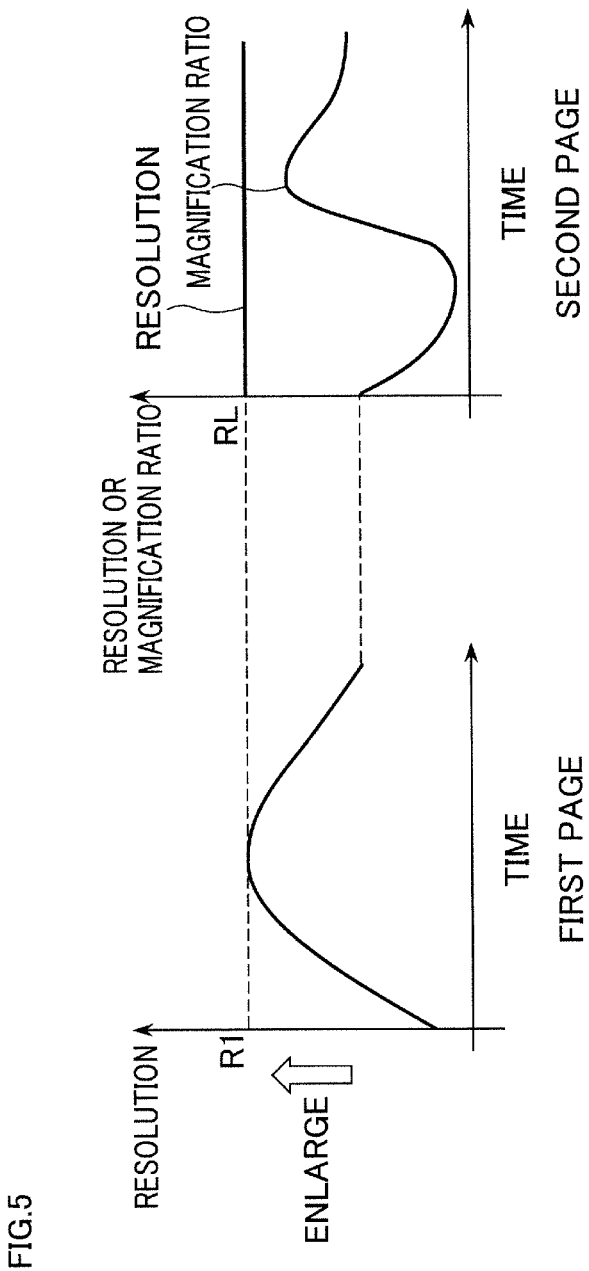
FIG. 5 shows a first determining method for determining a resolution of a new preview image.

FIG. 5 shows a first determining method for determining a resolution of a new preview image.

Referring to FIG. 5, by the first determining method, image forming apparatus 1 determines resolution RL of a preview image of the second page based on the highest resolution R1 included in the history. For example, image forming apparatus 1 may determine resolution RL as the highest resolution R1. The result of a calculation based on highest resolution R1 (for example, the value computed by multiplying highest resolution R1 by the value of 0.9, 1.1, or the like) may be a resolution RL. Further, the average amount of the history of the resolution includes highest resolution R1 may be resolution RL.

When a user confirmed characters included in the first page by enlarging the characters at a magnification ratio corresponds to highest resolution R1, there is a high possibility of enlarging characters in the second page to the extent of the magnification ratio of the first page for confirmation. In the first determining method, image forming apparatus 1 presumes that a resolution the user needs is resolution RL determined based on highest resolution R1. Thus, a preview image of the second page can be enlarged and displayed fast at the suitable resolution when the user confirms the preview image of the second page by the similar manner to a preview image of the first page.

Figure 6:
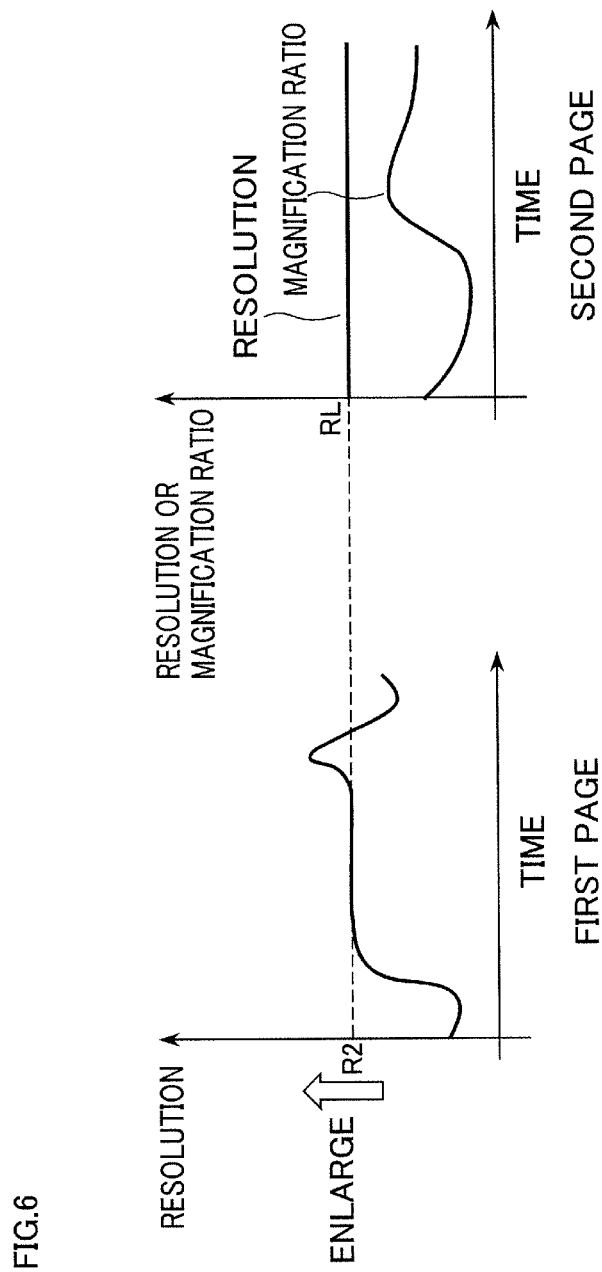
FIG. 6 shows a second determining method for determining a resolution of a new preview image.

FIG. 6 shows a second determining method for determining a resolution of a new preview image.

Referring to FIG. 6, by the second determining method, image forming apparatus 1 determines resolution R2 which is adopted during the longest time in the history as resolution RL of a preview image of the second page.

When a user adopts resolution R2 during the longest time for confirmation of characters in the first page, there is a high possibility of enlarging characters in the second page to the extent of the magnification ratio of the first page for confirmation. According to the second determining method, image forming apparatus 1 presumes that a resolution the user needs is resolution R2 which is adopted during the longest time. Thus, a preview image of the second page can be enlarged and displayed fast at the suitable resolution, when the user confirms the preview image of the second page by the similar manner to a preview image of the first page.

Figure 7:
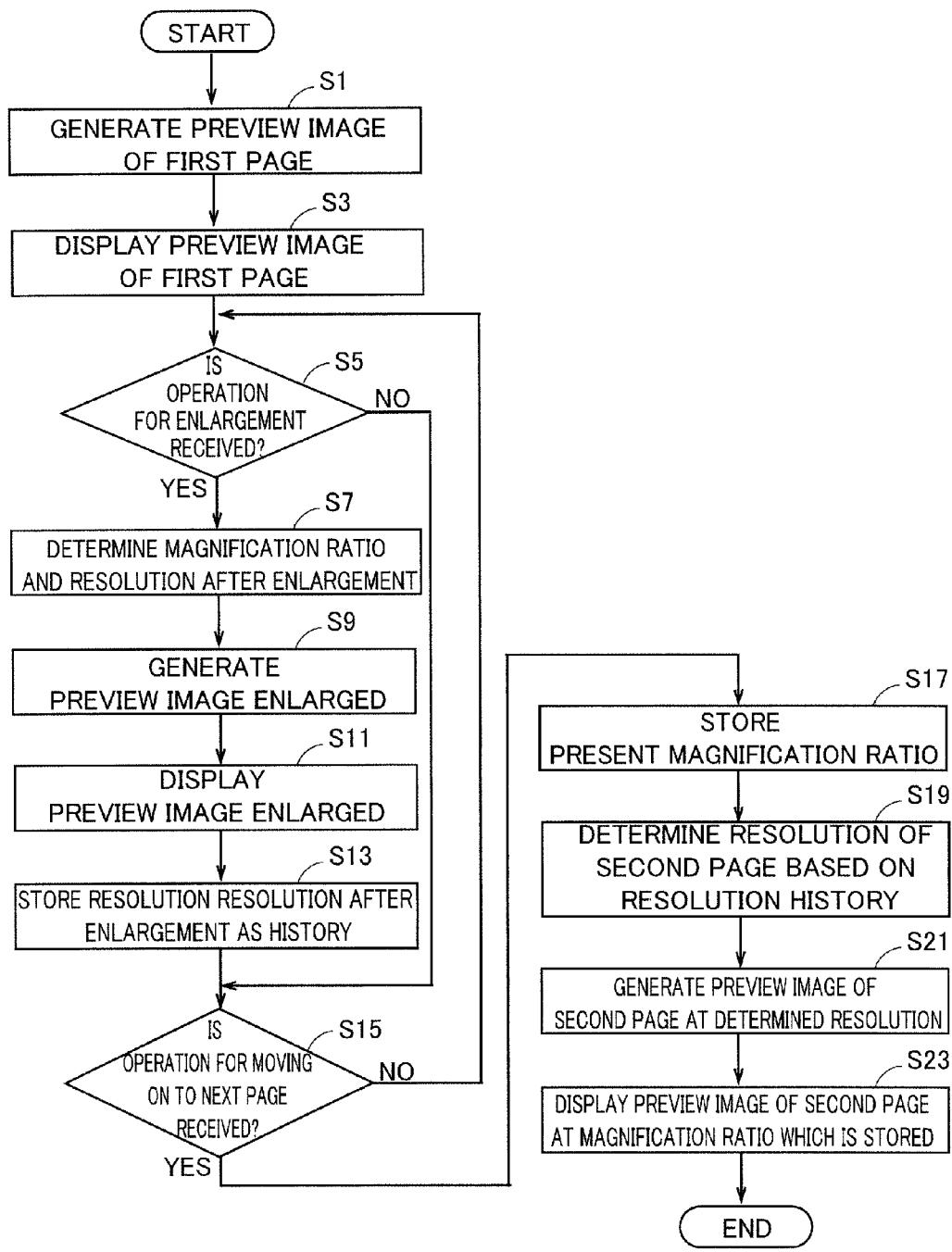
FIG. 7 shows a flowchart of a behavior of the image forming apparatus when using the first determining method or the second determining method.

FIG. 7 shows a flowchart of a behavior of an image forming apparatus when using the first determining method or the second determining method.

Referring to FIG. 7, When CPU 101 of image forming apparatus 1 reads a document image at the situation that a preview function is activated via operation panel 130 or the like, CPU 101 generates a preview image of the first page of the read document (S1). CPU 101 displays the generated preview image in area AR1 (S3). Next, CPU 101 determines whether an operation for enlarging the preview image being displayed is received or not (S5).

In step S5, if an operation for enlarging the preview image being displayed is not received (NO in S5), the process of CPU 101 proceeds to step S15.

In step S5, if an operation for enlarging the preview image being displayed is received (YES in S5), CPU 101 determines a magnification ratio and a resolution after enlarging based on the received operation (S7). CPU 101 generates a preview image enlarged (S9), and displays the same at the determined magnification ratio in area AR1 (S11). Next, CPU 101 stores the resolution of the preview image enlarged as a history (S13), and the process of CPU 101 proceeds to step S15.

In step S15, CPU 101 determines whether an operation for moving on to the next page is received or not (S15).

In step S15, if an operation for moving on to the next page is not received (NO in S15), the process of CPU 101 proceeds to step S5.

In step S15, if an operation for moving on to the next page is received (YES in S15), CPU 101 stores the present magnification ratio of the preview image of the first page into fixed storage device 110 or the like (S17). Next, CPU 101 determines a resolution based on resolutions in the history using the first or the second determining method (S19). CPU 101 generates a preview image of the second page at the determined resolution (S21). After that, CPU 101 displays the generated preview image in area AR1 at the magnification ratio stored (S23), and terminates the process.

Image forming apparatus 1 may determine a resolution based on the history of at least one of a magnification ratio and a resolution of a preview image. When image forming apparatus 1 determines a resolution based on a history of a magnification ratio of a preview image, it is possible to adopt the first and the second determination method by replacing the resolution with the magnification ratio in the aforementioned explanation of the first and the second determination method. Further, image forming apparatus 1 may determine a resolution using a method other than the first and the second determination method. The first and the second addition process in the followings may be added when using the first or the second determining method.

Figure 8:
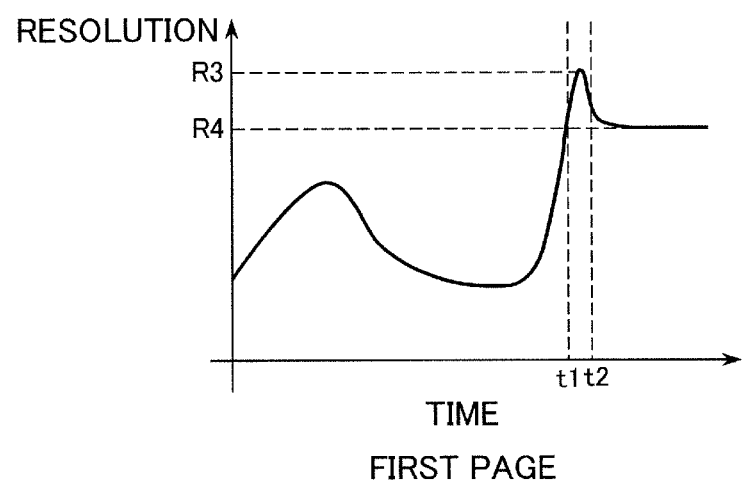
FIG. 8 shows the first addition process.

FIG. 8 shows the first addition process.

Referring to FIG. 8, a resolution of a preview image of the first page exceeds resolution R4, reaches resolution R3 and is reduced to resolution R4 between time t1 and t2 (<time period T).

In the first modification, image forming apparatus 1 does not store a magnification ratio and a resolution which is adopted during a period shorter than time period T as a history. Image forming apparatus 1 stores a magnification ratio and a resolution of a preview image which is displayed continuously during a period equal to or more than time period T. If a change with the passage of time of a resolution of a preview image of the first page is the one shown in FIG. 8, image forming apparatus 1 does not store a magnification ratio and a resolution between time t1 and t2 as a history. In consequence, when this modification is adopted to the first determining method for example, image forming apparatus 1 determines the resolution of a preview image of the second page based on resolution R4. Resolution R4 is the highest resolution except for resolution R3.

In case of an operation for enlarging, for example a pinch out operation, a user occasionally enlarges a preview image at an excessive magnification ratio over the intended magnification ratio. In this case, the user immediately reduces the preview image in consideration of the over enlargement. Therefore, image forming apparatus 1 does not store a magnification ratio and a resolution which were adopted during a period shorter than a prescribed time T as a history. Then, image forming apparatus 1 accurately ignores a resolution when over enlargement and stores only the resolution the user needed as a history.

Figure 9:
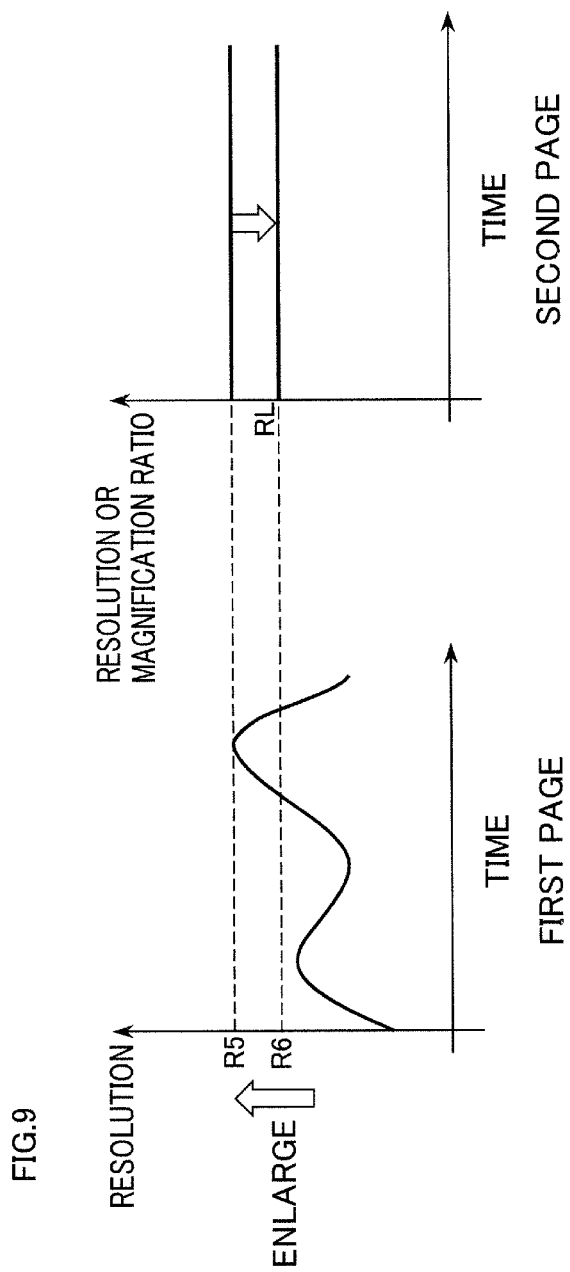
FIG. 9 shows the second addition process.

FIG. 9 shows the second addition process.

Referring to FIG. 9, assume that a resolution of a preview image of the second page is determined as resolution R5 based on a history of a resolution of a preview image of the first page. Resolution R5 is a value over resolution R6 of display portion 134 for displaying the preview image of the second page. In this case, image forming apparatus 1 changes resolution RL of the preview image of the second page from resolution R5 to resolution R6. The changed resolution can be a resolution equal to or less than resolution R6.

If image forming apparatus 1 generates a preview image at a resolution over the resolution R6 of display portion 134, the preview image cannot be displayed at the resolution. Hence, a preview image of the second page can be enlarged and displayed fast by setting a resolution of a preview image of the second page less than resolution R6 of display portion 134.

Both the first and the second addition process can be added to the first or the second method for determining a resolution. One of the first and the second addition process can be added to the first or the second method for determining a resolution.

Figure 10:
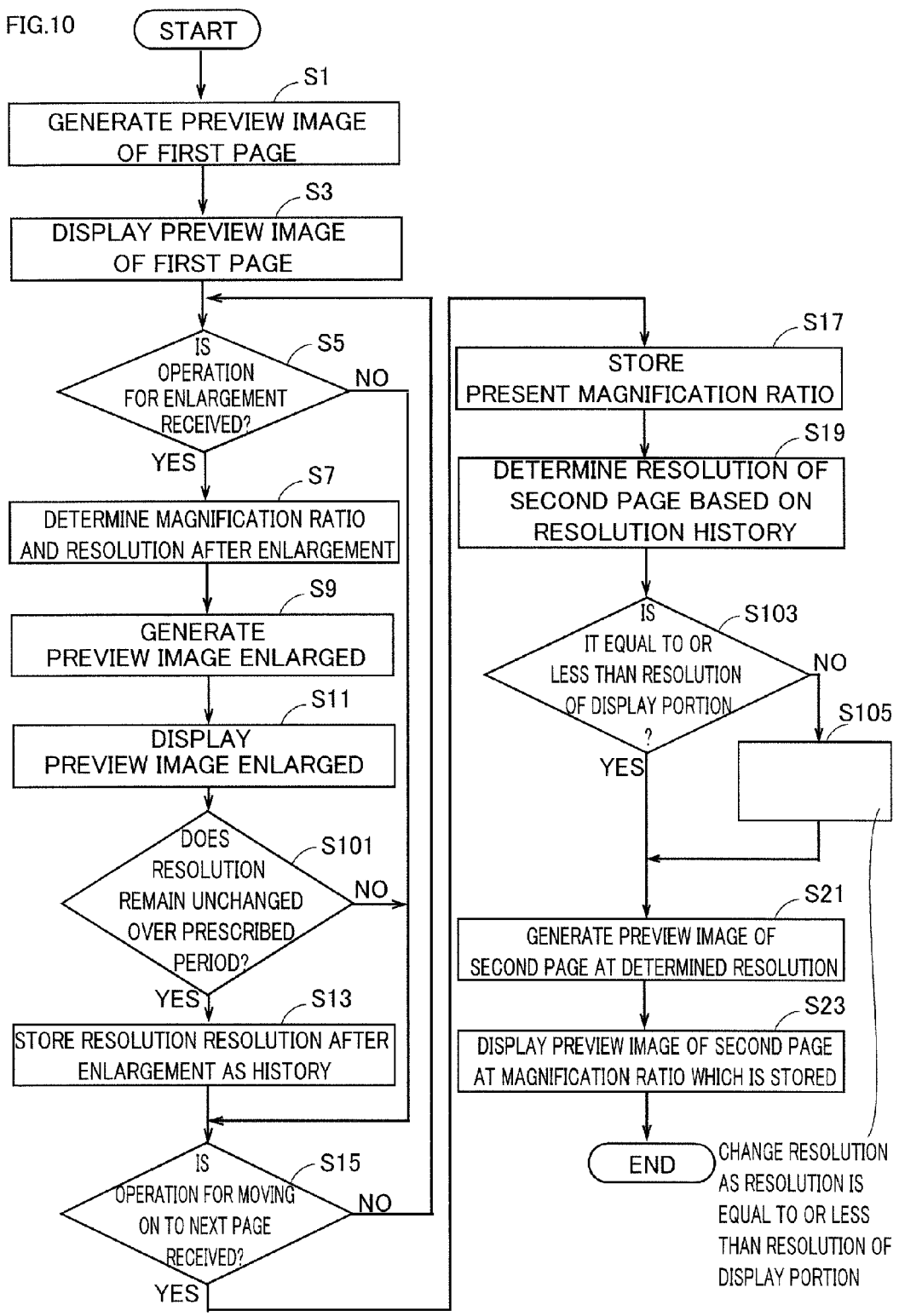
FIG. 10 shows a flowchart for a behavior of the image forming apparatus when adding both of the first and the second addition process to the first resolution determining method or the second resolution determining method.

FIG. 10 shows a flowchart for a behavior of an image forming apparatus when adding both of the first and the second addition process to the first resolution determining method or the second resolution determining method.

Referring to FIG. 10, the flowchart differs from the flowchart of FIG. 7 in that the process of step S101 is executed after the process of step S11 and the processes of step S103 or the like are executed after the process of step S19.

CPU 101 determines whether a resolution of a preview image displayed in area AR1 remains unchanged over a prescribed period or not (S101), after the generated preview image was displayed in area AR1 in step S11.

In step S101, when CPU 101 determines the resolution remains unchanged over the prescribed period (YES in S101), CPU 101 stores the resolution of the preview image enlarged as a history (S13), and the process of CPU 101 proceeds to step S15. On the other hand, when CPU 101 determines the resolution changed before passing the prescribed period (NO in S101), CPU 101 does not store the resolution of the preview image enlarged as the history, and the process of CPU 101 proceeds to step S15.

After a resolution of the image enlarged is determined based on a resolution in the history in step S19, CPU 101 determines whether the determined resolution is equal to or less than the resolution of display portion 134 or not (S103).

In step S103, if the resolution determined is equal to or less than the resolution of display portion 134 (YES in S103), CPU 101 generates a preview image of the second page at the determined resolution (S21), and the process of CPU 101 proceeds to step S23. On the other hand, the determined resolution is more than the resolution of display portion 134 (NO in S103), CPU 101 changes the resolution as a resolution is equal to or less than the resolution of display portion 134 (S105), generates a preview image of the second page at the changed resolution (S21), and the process of CPU 101 proceeds to step S23.

[Modifications of a Behavior of the Image Forming Apparatus]

Next, modifications of a behavior of the image forming apparatus will be explained. Hereinafter, the first, the second and the third modifications will be explained. Behaviors and structures of image forming apparatus 1, which are not explained in the first, the second and the third modifications are same as in aforementioned embodiments. Therefore, these explanations will not be repeated.

Figure 11:
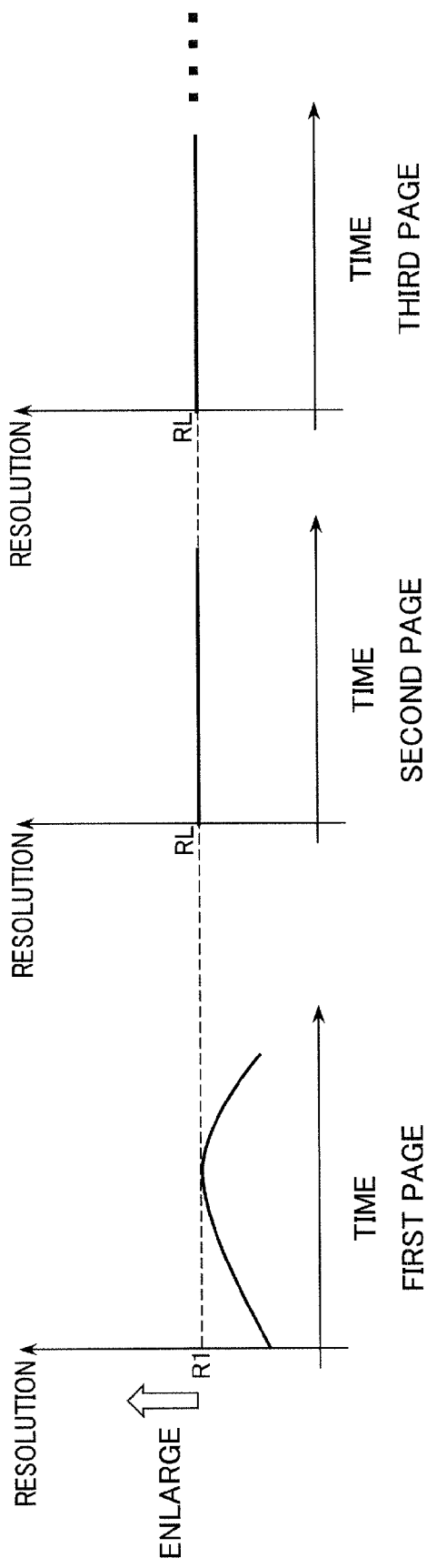
FIG. 11 shows a first modification.

FIG. 11 shows a first modification.

Referring to FIG. 11, assume that image forming apparatus 1 receives an operation for displaying a preview image of the second page, when displaying a preview image of the first page of the document read. Image forming apparatus 1 determines resolution RL of a preview image of the second page based on the highest resolution R1 in the history. In this situation, image forming apparatus 1 generates a preview image of the third page with the preview image of the second page (as long as the third page exists) when resolution RL is less than threshold value TH1 of a resolution (an example of the first threshold value) and the amount of a spare capacity of fixed storage device 110 (an example of a memory or a storage) is more then threshold value TH2 (an example of the second threshold value) of the amount of a spare capacity.

Here, assume that resolution RL is less than threshold value TH1 of a resolution and the amount of a spare capacity of fixed storage device 110 is more than threshold value TH3 (an example of the third threshold value) of the amount of a spare capacity. In this case, image forming apparatus 1 determines that the amount of a spare capacity of fixed storage device 110 is enough, and may further generate a preview image of the previous page of the first page and/or preview images of the fourth page and subsequent pages (as long as there is a previous page of the first page and/or fourth page and subsequent pages). Threshold value TH3 may be the same as threshold value TH2. Threshold value TH3 may be larger than threshold value TH2.

Figure 12:
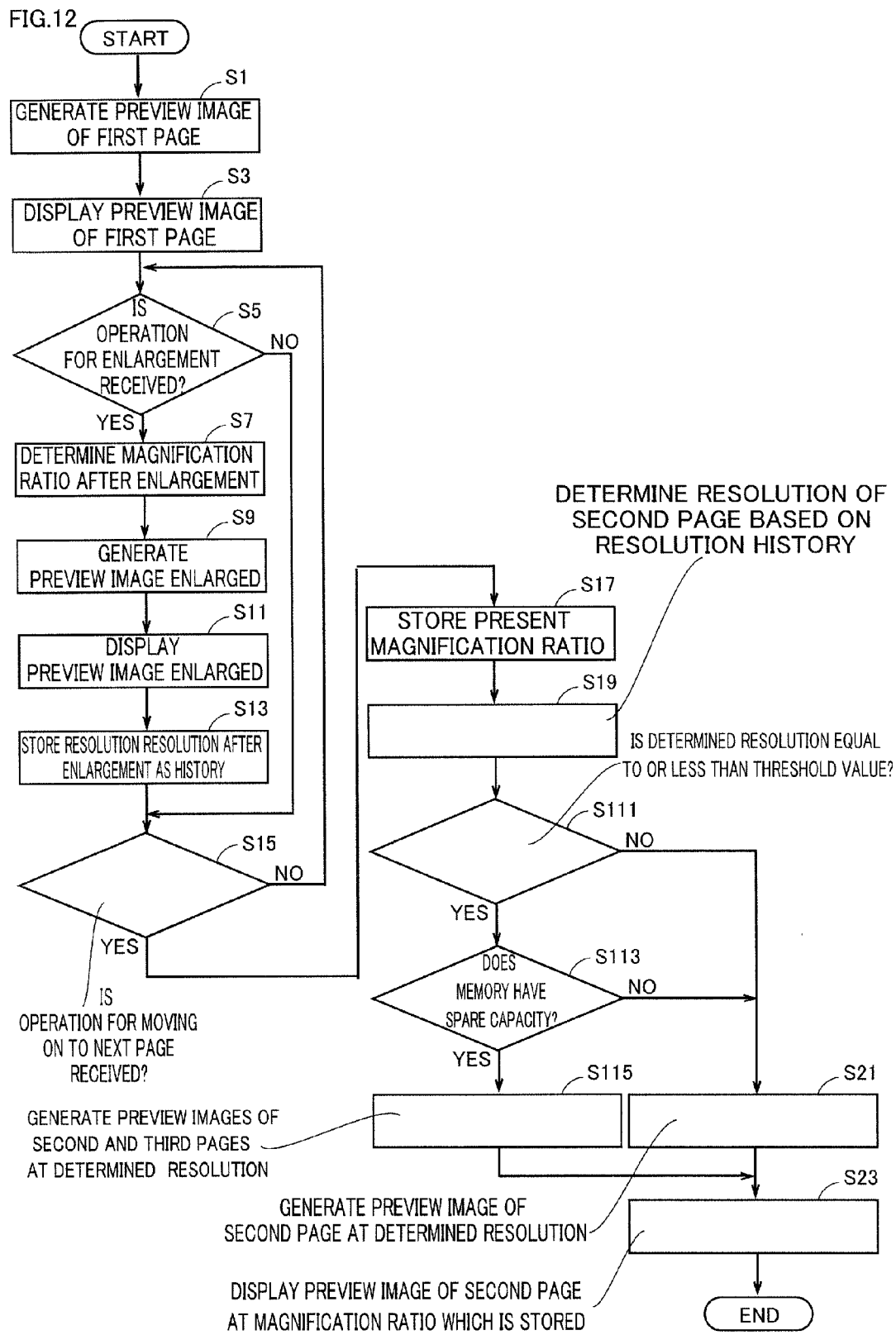
FIG. 12 shows a flowchart for a behavior of an image forming apparatus at the first modification.

FIG. 12 shows a flowchart for a behavior of the image forming apparatus at the first modification.

Referring to FIG. 12, this flowchart differs from the flowchart of FIG. 7 in that the processes of step S111 or the like are executed after the process of step S19.

CPU 101 determines whether the resolution determined is equal to or less than a threshold value of a resolution or not (S111) after CPU 101 determined the resolution of a preview image of the second page based on a resolution in the history in step S19.

In step S111, if the determined resolution is equal to or less than the threshold value of a resolution (YES in S111), CPU 101 determines whether the amount of a spare capacity of a memory is more than the threshold value of the amount of a spare capacity or not (S113).

In step S113, if the amount of a spare capacity of a memory is more than the threshold value of the amount of a spare capacity (YES in S113), CPU 101 generates preview images of the second and the third pages at the determined resolution (S115). Then CPU 101 displays a preview image of the second page in area AR1 at the stored magnification ratio (S23), and terminates the processes.

In step S111, If the determined resolution is more than the threshold value of a resolution (NO in S111) or in step S113, the amount of a spare capacity of the memory is equal to or less than the threshold value of the amount of a spare capacity (NO in S113). CPU 101 generates a preview image of the second page at the determined resolution (S21). CPU 101 displays a preview image of the second page in area AR1 at the stored magnification ratio (S23), and terminates the processes.

Assume that high resolution images are not necessary since there is a tendency for a user not to enlarge images as in the first modification and there are free spaces in a memory for storing images of a plurality of pages. In this situation, image forming apparatus 1 generates preview images of a plurality of pages previously. In a result, image forming apparatus 1 can display a preview image fast after moving about the page at a suitable resolution when a user moved on to a preview image of a page which is after a few pages from the current page.

Figure 13:
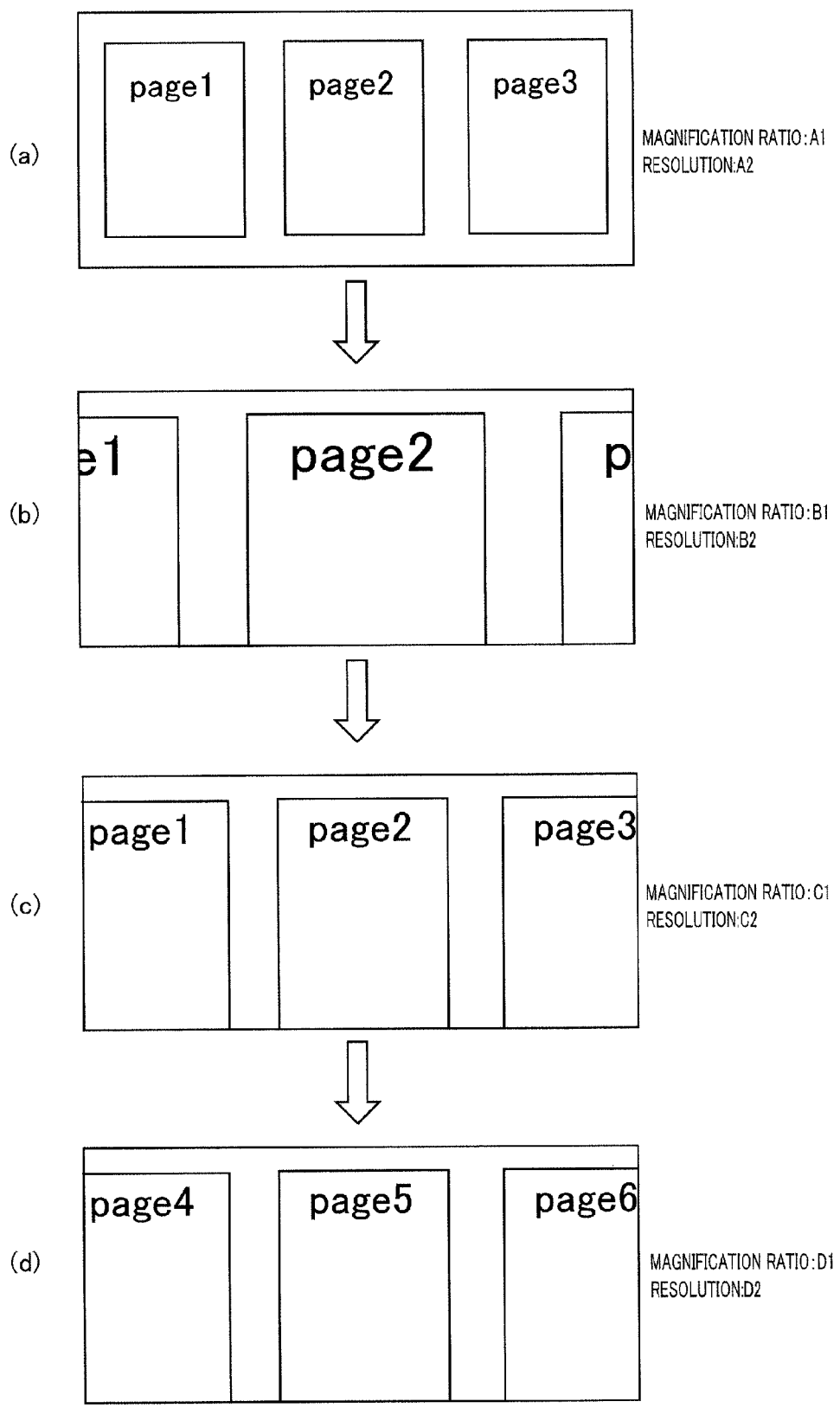
FIG. 13 shows a second modification.

FIG. 13 shows a second modification.

Referring to FIG. 13, image forming apparatus 1 may display preview images of a plurality of pages at once in the display.

Image forming apparatus 1 reads documents in the situation that a preview function is activated by operation panel 130 or the like. Image forming apparatus 1 firstly generates preview images of the first, the second, and the third pages at resolution A2 corresponds to magnification ratio A1 as shown in FIG. 13(a). Image forming apparatus 1 displays the generated preview images in area AR1 at magnification ratio A1.

Image forming apparatus 1 receives an operation for enlarging preview images from a user, when displaying the preview images as shown in FIG. 13(a). Image forming apparatus 1 determines magnification ratio B1 and resolution B2 based on the operation by the user. Image forming apparatus 1 generates preview images which are parts of preview images in FIG. 13(a) at resolution B2. As shown in FIG. 13(b), image forming apparatus 1 displays the generated preview images in area AR1 at magnification ratio B1.

Image forming apparatus 1 receives an operation for reducing preview images from a user, when displaying the preview images as shown in FIG. 13(h). Image forming apparatus 1 determines magnification ratio C1 and resolution C2 based on the operation by the user. Image forming apparatus 1 generates preview images which are parts of the preview images in FIG. 13(a) at resolution C2. Image forming apparatus 1 displays the generated preview images in area AR1 at magnification ratio C1 as shown in FIG. 13(c).

Image forming apparatus 1 receives an operation for displaying a preview image of the next page from a user, when displaying the preview images as shown in FIG. 13(c). Image forming apparatus 1 determines resolution D2 based on the history of a resolution of preview images of the first, the second and the third pages. Image forming apparatus 1 generates preview images of the fourth, the fifth, and the sixth pages at resolution D2. Image forming apparatus 1 displays the generated preview images in area AR1 at magnification ratio D1, as shown in FIG. 13(d).

In the third modification, When image forming apparatus 1 displays a preview image of the first page in the second modification, image forming apparatus 1 stores a history of a magnification ratio of the preview image of the first page instead of (or with) a history of a resolution of the preview image of the first page. Image forming apparatus 1 may not store a magnification ratio which is adopted shorter than a prescribed period T as the history. Image forming apparatus 1 may store a magnification ratio which is continuously adopted during a time equal to or longer than a prescribed time T (the first addition process).

Figure 14:
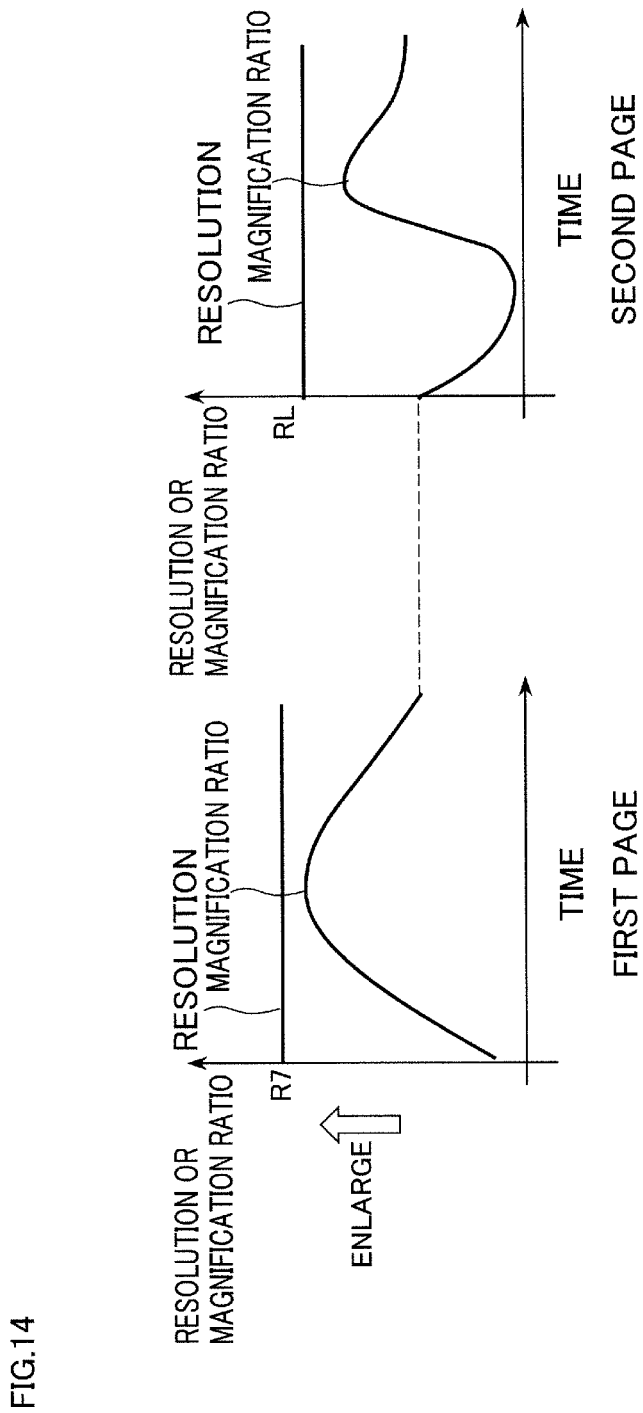
FIG. 14 shows a third modification.

FIG. 14 shows a third modification.

Referring to FIG. 14, when image forming apparatus 1 stores a history of a magnification ratio of a preview image of the first page, the resolution of a preview image of the first page may be a constant value (resolution R7) irrespective of the magnification ratio. Image forming apparatus 1 displays the preview image at a low magnification ratio which was generated at the high resolution even if the resolution of the generated preview image of the first page is high compared with the magnification ratio.

Image forming apparatus 1 receives an operation for displaying a new preview image (at this section, a preview image of the second page) which differs from a preview image of the first page, when displaying a preview image of the first page. Image forming apparatus 1 determines resolution RL of the new preview image based on the history of the magnification ratio of the preview image of the first page. Image forming apparatus 1 generates and displays the new preview image at the determined resolution RL. Image forming apparatus 1 may determine resolution RL based on the highest magnification ratio in the history (the first determining method), for example. Image forming apparatus 1 may determine resolution RL based on a magnification ratio which was adopted during the longest period (the second determining method).

FIG. 15 shows a flowchart for a behavior of an image forming apparatus at the third modification.

Referring to FIG. 15, CPU 101 of image forming apparatus 1 reads images of a document in the situation a preview function is activated by operation panel 130 or the like. CPU 101 generates a preview image of the first page of the document read (S201). CPU 101 displays the generated preview image in area AR1 (S203). Next, CPU 101 determines whether an operation for enlarging the preview image being displayed is received or not (S205).

In step S205, if CPU 101 determines that an operation for enlarging the preview image being displayed is not received (NO in S205), the process of CPU 101 proceeds to step S215.

In step S205, if CPU 101 determines that an operation for enlarging the preview image being displayed is received (YES in S205), CPU 101 determines a magnification ratio after the enlargement based on the received operation (S207). CPU 101 displays the preview image generated by the process of step S201 in area AR1 at the determined magnification ratio (S211). Next, CPU 101 stores the magnification ratio of the preview image enlarged as a history (S213), and the process of CPU 101 proceeds to step S215.

CPU 101 determines whether an operation for moving on to the next page is received or not (S215).

In step S215, when CPU 101 determines that an operation for moving on to the next page is not received (NO in S215), the process of CPU 101 proceeds to step S205.

In step S215, when CPU 101 determines that an operation for moving on to the next page is received (YES in S215), CPU 101 determines a resolution based on a magnification ratio in the history using the first or the second determining method (S219). CPU 101 generates a preview image of the second page at the determined resolution (S221). Next, CPU 101 displays the generated preview image in area AR1 at the magnification ratio which is stored most recently (S223), and terminates the process.

[The advantages of the embodiments]

According to the above embodiments, an image displaying apparatus which can display a preview image fast is provided.

According to the above embodiments, an image forming apparatus can generate a preview image at the minimum resolution which a user needs, and display the image when a displayed preview image changes from the present preview image to another preview image. In a result, the image forming apparatus can keep memory consumption to the minimum necessary and display the another preview image fast at a suitable resolution.

[Others]

The above embodiments can be combined each other. For example, the behavior of the image forming apparatus explained with FIG. 4 and the behavior of the image forming apparatus in the second modification can be combined. Thus, image footling apparatus 1 stores a magnification ratio of the changed preview image in fixed storage device 110 each time a magnification ratio of a preview image of the first page displayed in area AR1 changed. Image forming apparatus 1 may store only a transition of a magnification ratio of a preview image each time a magnification ratio of a preview image of the first page displayed in area AR1 changed. Image forming apparatus 1 may store a change of a magnification ratio of a preview image with the passage of time, each time a magnification ratio of a preview image of the first page displayed in area AR1 changed.

The processes described in the above embodiments can be executed by software or a hardware circuit. A computer program which executes the processes in the above embodiments can be provided. The program may be provided recorded in recording media of CD-ROMs, flexible disks, hard disks, ROMs, RAM, memory cards, or the like to users. The program is executed by a computer of a CPU or the like. The program may be downloaded to a device via communication lines like the internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image displaying apparatus comprising:
a hardware processor configured to:
display a first preview image at a first resolution;
receive an operation to enlarge the first preview image;

display the first preview image enlarged when the operation to enlarge the first preview image is received;
store a history of at least one of a magnification ratio of the first preview image being displayed and a resolution of the first preview image being displayed, the history including a change with the passage of time of at least one of the magnification ratio and the resolution of the first preview image being displayed;
receive an operation to display a second preview image which is not the first preview image when displaying the first preview image;
determine a second resolution based on the stored history when the operation to display the second preview image is received; and
generate the second preview image at the second resolution, wherein
a magnification ratio and a resolution adopted during a period shorter than a prescribed period are not stored as the history.

2. The image displaying apparatus according to claim 1, wherein
at least one of a magnification ratio changed and a resolution changed of the first preview image is stored, each time at least one of a magnification ratio and a resolution of the first preview image being displayed changes.

3. The image displaying apparatus according to claim 1, wherein
the second resolution is determined based on the maximum magnification ratio or the maximum resolution in the stored history.

4. The image displaying apparatus according to claim 1, wherein
a resolution equal to or less than a resolution of a display of the second preview image is determined as the second resolution.

5. The image displaying apparatus according to claim 1, the hardware processor further configured to:
display the second preview image at a magnification ratio equal to the magnification ratio of the first preview image displayed most recently.

6. The image displaying apparatus according to claim 1, wherein
the first preview image is a part of images in a file,
the second preview image is at least one of:
(i) a preview image of another image in a page in which the original image of the first preview image is included; and
(ii) a preview image of a page different from a page in which the original image of the first preview image in the file is included.

7. The image displaying apparatus according to claim 6, wherein
the second preview image is a preview image of the next page of an original image of the first preview image in a file,
the hardware processor is further configured to acquire the amount of a spare capacity of a memory of the image displaying apparatus, and
generate a third preview image having the second resolution that is a preview image of the next page of the second preview image in the file, when the second resolution is lower than a first threshold value and the amount of the spare capacity acquired by the hardware processor is larger than a second threshold value.

8. The image displaying apparatus according to claim 7, wherein
the hardware processor further generates a fourth preview image having the second resolution that is a preview image of the previous page of the original image of the first preview image in the file, when the second resolution is lower than the first threshold value and the amount of the spare capacity acquired by the hardware processor is larger than a third threshold value.

9. The image displaying apparatus according to claim 1, wherein
the hardware processor receives an operation to enlarge the first preview image by at least one of a key pressing and a pinch out operation.

10. The image displaying apparatus according to claim 1, wherein
the hardware processor receives an operation to display the second preview image at least one of a key pressing, a flick operation, and a swipe operation.

11. The image displaying apparatus according to claim 1, wherein said stored history includes at least one magnification ratio or resolution different from the current magnification ratio or resolution of the first preview image being displayed.

12. An image displaying apparatus comprising:
a hardware processor configured to:
display a first preview image at a first resolution;
receive an operation to enlarge the first preview image;
display the first preview image enlarged when the operation to enlarge the first preview image is received;
store a history of at least one of a magnification ratio of the first preview image being displayed and a resolution of the first preview image being displayed, the history including a change with the passage of time of at least one of the magnification ratio and the resolution of the first preview image being displayed;
receive an operation to display a second preview image which is not the first preview image when displaying the first preview image;
determine a second resolution based on the stored history when the operation to display the second preview image is received; and
generate the second preview image at the second resolution, wherein
a resolution adopted during the longest period from among resolutions in the stored history is determined as the second resolution.

13. A method of controlling an image displaying apparatus comprising:
displaying a first preview image at a first resolution;
receiving an operation to enlarge the first preview image;
displaying the first preview image enlarged when receiving the operation to enlarge the first preview image;
storing a history of at least one of a magnification ratio of the first preview image being displayed and a resolution of the first preview image being displayed, the history including a change with the passage of time of at least one of the magnification ratio and the resolution of the first preview image being displayed;
receiving an operation to display a second preview image which is not the first preview image when displaying the first preview image;
determining a second resolution based on the history stored when receiving the operation to display the second preview image; and
generating the second preview image at the second resolution, wherein a magnification ratio and a resolution adopted during a period shorter than a prescribed period are not stored as the history.

14. A non-transitory computer-readable recording medium encoded with a control program for an image displaying apparatus, the control program causing a computer to execute the method of claim 13.

15. The method according to claim 13, wherein said stored history includes at least one magnification ratio or resolution different from the current magnification ratio or resolution of the first preview image being displayed.

16. An image displaying apparatus comprising:
a hardware processor configured to:
display a first preview image at a first resolution;
receive an operation to enlarge the first preview image;
display the first preview image enlarged when the operation to enlarge the first preview image is received;
store a history of at least one of a magnification ratio of the first preview image being displayed and a resolution of the first preview image being displayed;
receive an operation to display a second preview image which is not the first preview image when displaying the first preview image;
determine a second resolution based on the stored history when the operation to display the second preview image is received; and
generate the second preview image at the second resolution, wherein
the first preview image is a part of images in a file,
the second preview image is a preview image of the next page of an original image of the first preview image in a file,
the hardware processor is further configured to acquire the amount of a spare capacity of a memory of the image displaying apparatus, and
generate a third preview image having the second resolution that is a preview image of the next page of the second preview image in the file, when the second resolution is lower than a first threshold value and the amount of the spare capacity acquired by the hardware processor is larger than a second threshold value.

17. A method of controlling an image displaying apparatus comprising:
displaying a first preview image at a first resolution;
receiving an operation to enlarge the first preview image;
displaying the first preview image enlarged when receiving the operation to enlarge the first preview image;
storing a history of at least one of a magnification ratio of the first preview image being displayed and a resolution of the first preview image being displayed;
receiving an operation to display a second preview image which is not the first preview image when displaying the first preview image;
determining a second resolution based on the history stored when receiving the operation to display the second preview image; and
generating the second preview image at the second resolution, wherein
the first preview image is a part of images in a file,
the second preview image is a preview image of the next page of an original image of the first preview image in a file,
the method further comprising acquiring the amount of a spare capacity of a memory of the image displaying apparatus, and
generating a third preview image having the second resolution that is a preview image of the next page of the second preview image in the file, when the second resolution is lower than a first threshold value and the amount of the acquired spare capacity is larger than a second threshold value.

18. A non-transitory computer-readable recording medium encoded with a control program for an image displaying apparatus, the control program causing a computer to execute the method of claim 17.

19. A method of controlling an image displaying apparatus comprising:
displaying a first preview image at a first resolution;
receiving an operation to enlarge the first preview image;
displaying the first preview image enlarged when receiving the operation to enlarge the first preview image;
storing a history of at least one of a magnification ratio of the first preview image being displayed and a resolution of the first preview image being displayed, the history including a change with the passage of time of at least one of the magnification ratio and the resolution of the first preview image being displayed;
receiving an operation to display a second preview image which is not the first preview image when displaying the first preview image;
determining a second resolution based on the history stored when receiving the operation to display the second preview image; and
generating the second preview image at the second resolution, wherein
a resolution adopted during the longest period from among resolutions in the stored history is determined as the second resolution.

* * * * *